Sept. 25, 1962 H. F. FLOWERS 3,055,317
REINFORCED FLOOR FOR RAILROAD DUMP CAR
Filed March 19, 1956 2 Sheets-Sheet 1

INVENTOR
HENRY FORT FLOWERS

ATTORNEYS

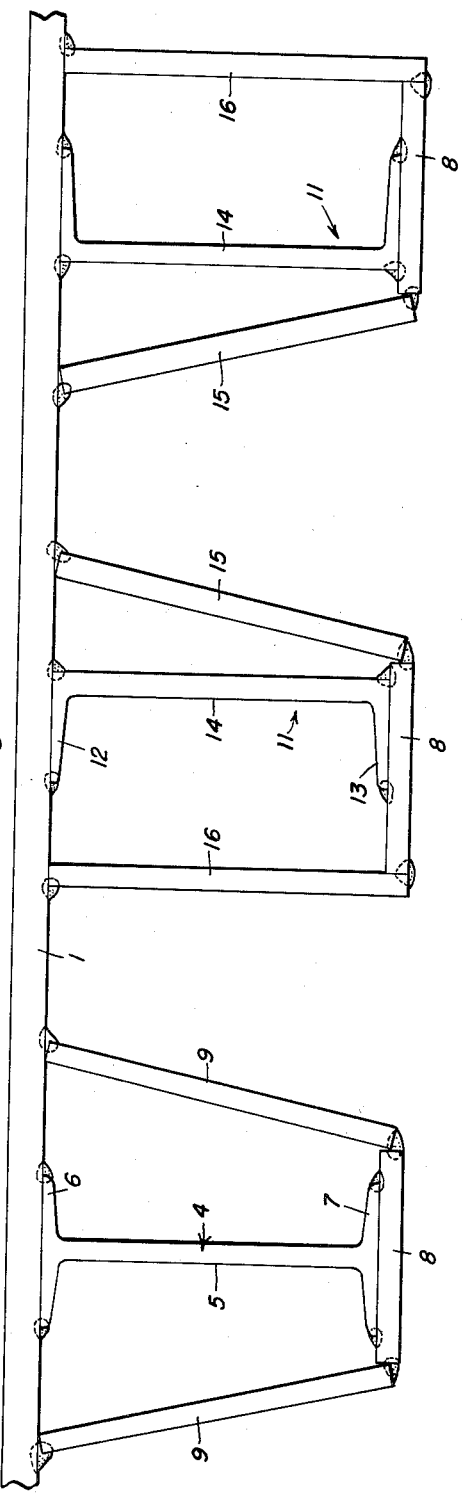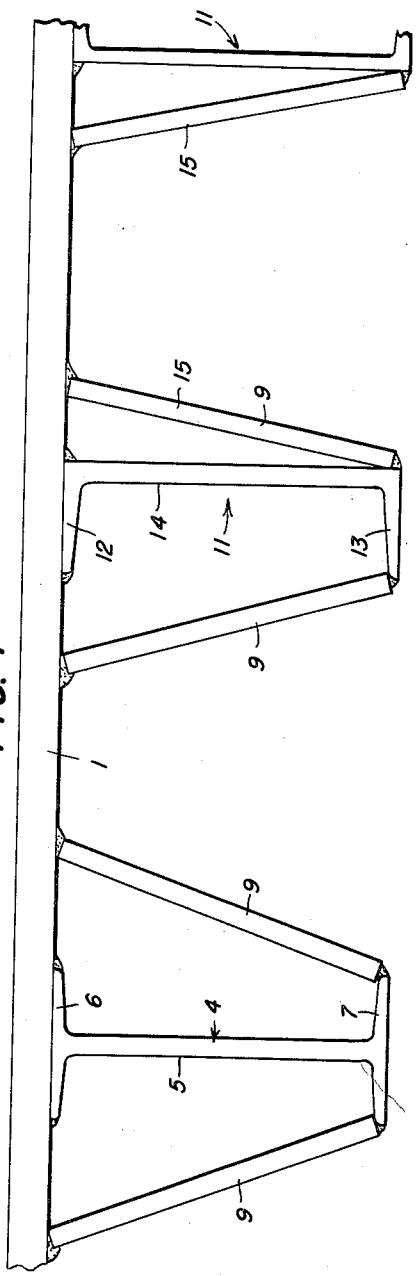

United States Patent Office 3,055,317
Patented Sept. 25, 1962

3,055,317
REINFORCED FLOOR FOR RAILROAD DUMP CAR
Henry Fort Flowers, Findlay, Ohio
(3023 Del Monte Drive, Houston 19, Tex.)
Filed Mar. 19, 1956, Ser. No. 572,545
7 Claims. (Cl. 105—422)

The invention of which the following is a detailed specification relates to a reinforced floor for railroad dump cars.

Railroad dump cars are customarily manufactured with sheet metal floors made of a continuous plate. Such floors are reinforced at regular intervals by transverse floor beams providing support for areas of considerable span. In loading such a car with heavy material such as boulders, rocks, large timber and other heavy objects, the impact upon the span between two transverse beams is very large. It is well known that such impact frequently dents the floor. This provides a depression which interferes with the unloading of the material over the tilted side of the car. Moreover, such depressions form lodgment for water which during cold weather freezes and thus attaches the cargo to the car floor so that unloading is seriously interfered with.

One of the objects of this invention is to reduce damage to car floors from the impact of heavy loads such as rocks, boulders, bars, heavy timber and the like during loading.

It is a further object of the invention to strengthen the car floor to a degree greatly in excess of the proportional increase in weight of the car floor and its supports.

Among the objects of the invention is to provide adequate strength of the car floor and at the same time make possible the substitution of extra high-strength heat-treated alloy steel for the floor plates. This results in a marked increase in strength and rigidity and at the same time reduction in gauge of the floor plates.

A still further object of the invention is to decrease the length of unsupported span between adjacent transverse floor beams.

A further object of the invention is to reinforce the floor surface so that the falling impact of large objects and heavy weights will be distributed uniformly over the floor surface.

Among the objects of the invention is to strengthen the bottom flanges of the floor beams against undue stress.

Still further it is an object of the invention to prevent the bending or other deformation of the webs of the floor beams. By doing so it has been found possible to triple the strength of each floor beam.

An incidental object of the invention is to graduate the strength of the floor beams against stress at the points where reinforcement starts.

Related to the last named purpose is that of distributing and graduating the stress on the floor where reinforcement is begun.

It will also be apparent that this invention permits the fabrication of the car floor by manual or semi-automatic welding of readily available metal sheets, plates, bars and other structural forms.

The above and other objects of the invention will be apparent from the following description of the preferred form of the invention as illustrated on the accompanying drawings in which:

FIG. 3 is an enlarged side elevation of a section of the floor and

FIG. 4 is an enlarged side elevation of a modified form of the floor.

Figures 1, 2:
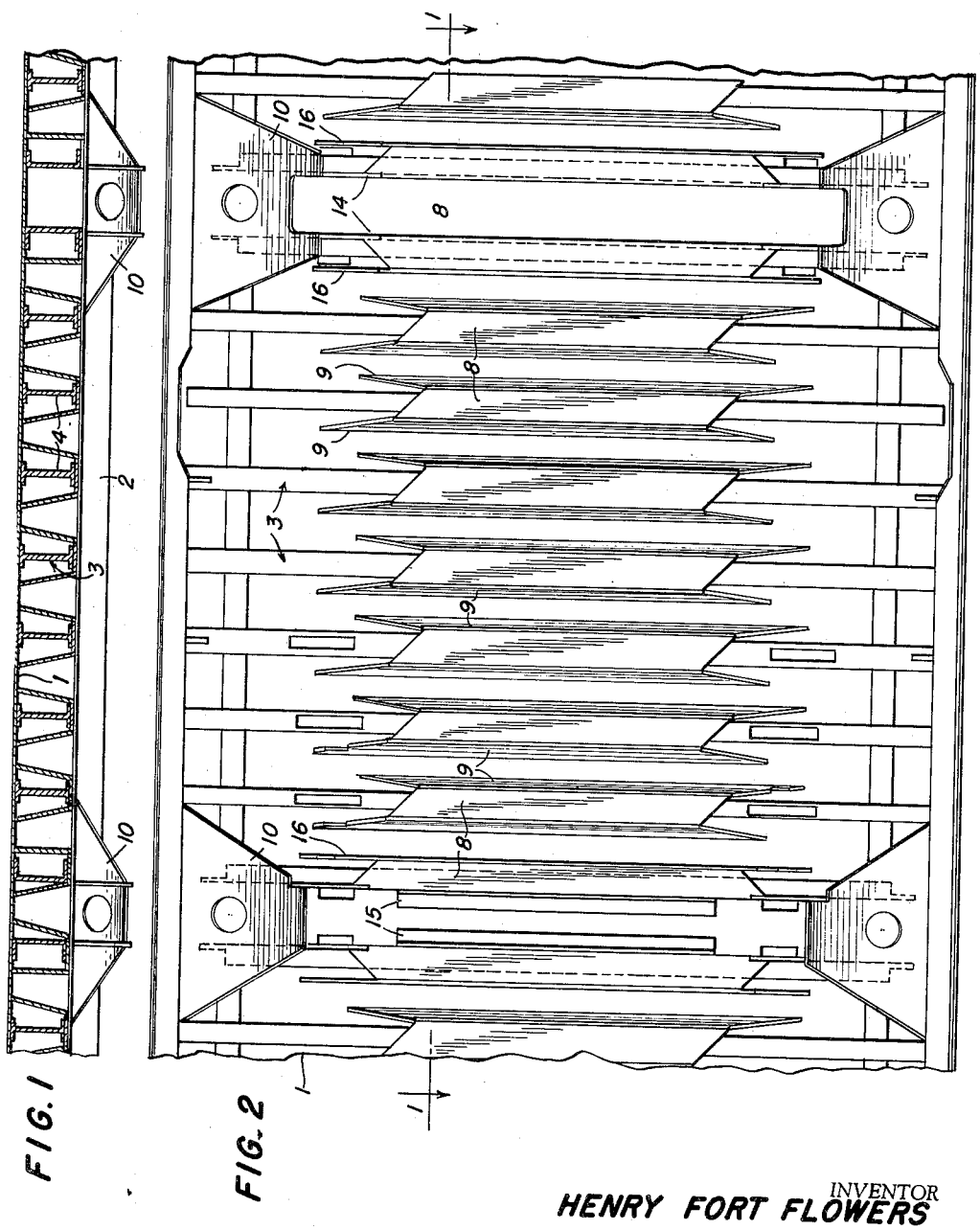
FIG. 1 is a vertical longitudinal section of my improved floor for a railroad dump car taken on the line 1—1 of FIG. 2.
FIG. 2 is a bottom plan view of the floor construction.

Generally speaking the invention consists in providing a reinforcement between the bottom of each transverse beam and intermediate points along the span of the car floor plate between adjacent floor beams. This forms a substantially continuous reinforcement along the length of the car floor plate and extending transversely over the middle portion where the impact or load of material strikes.

In the drawings, a floor plate 1 is shown. This is made of high strength heat-treated alloy steel. By virtue of the uniform reinforcement from below, the floor plate may therefore be made of less gauge and considerably less weight than is usual.

A skirt plate 2 is welded to each side edge of the floor plate. Floor beams 3, 3 extend transversely between the skirt plates and support the floor plate. The floor plate, skirt plates and floor beams are continuously welded together to form a car bottom of unitary structure.

The majority of the transverse floor beams are formed as I beams 4. Each such beam has a web 5 between a top flange 6 and a bottom flange 7. The top flanges 6 are welded continuously to the bottom surface of the floor plate.

Each bottom flange 7 is reinforced by a sole plate 8. Such sole plates as shown in FIG. 2 are parallelograms having inclined ends. In this manner, when the sole plates are welded to the bottom flange 7, as shown in FIG. 3, the reinforcement is graduated at each end so that the weight on the flanges is distributed to prevent localized stress.

The sole plates are of sufficient length to extend transversely of the floor plate or such intermediate area of the latter as normally receives the impact of heavy objects during loading.

Each sole plate 8 has a brace or slope plate 9. This slope plate is welded to the longitudinal edge of the sole plate 8. It is of sufficient length to form a strut reaching the undersurface of the floor plate substantially one third of the distance between the top flanges 6 of the adjacent beams.

Equally spaced along the sides of the dump car, are provision for hinges for the drop sides not illustrated. Such hinges operate through the shields 10, 10 shown on FIGS. 1 and 2. Such hinges of well known type operate between adjacent transverse floor beams. In such case the floor beams are in the form of channels 11, 11. Such channels have top flanges 12 and bottom flanges 13. The intervening space provides for the reception of the trunnion levers and other hinge members, not illustrated.

In reinforcing the channel members 11, the sole plate 8 extends longitudinally as above described. Transversely it extends from close to the web 14 of the channel under the bottom flange 13. This enlarges the clearance between the webs of the adjacent channels 11, 11. Suitable struts or slope plates form the braces 15, 15 extending from the portion of the plate 8 underlying the web 14 to an intermediate point under the floor plate 1. The braces 15, 15 are welded along their side edges, at the bottom to the sole plate 8, and at the top to the floor plate 1.

A vertical brace 16 is welded to the end of the sole plate 8 and at the top to the floor plate 1 (FIG. 3). This completes the formation of a box beam at this point of reinforcement.

As shown on FIG. 2, the braces 9, 9 and 16 are longer at their upper edges than at the lower edges. In other words, their contacts along the floor plate have been extended beyond the contacts with the sole plates. Each brace at its bottom is coextensive with the longitudinal side edges of the sole plate. At the top the brace flares to make a more extended supporting contact with the floor plate, as shown in FIG. 2.

Each brace 9 slopes upwardly at the ends at a uniform angle. It will thus appear as shown in FIG. 2 that the brace on one side of the beam is longer at one end than is the brace on the other side of the beam. In other words, the supports for the floor plate are staggered on opposite sides of the beam and reversely staggered at the opposite end of the same beam. This distributes the reinforcement over a wider area and to a closer spacing from the sides of the floor plate than would otherwise occur. In this way the reinforcement of the floor plate is graduated transversely as well as longitudinally.

In some capacities of cars and for some types of loads, this even distribution of support for the floor plate may be provided directly from the bottom flanges of the transverse floor beams. This permits the result to be obtained without reliance upon a special sole plate. In FIG. 4, such an arrangement has been shown in which the floor plate 1 rests upon a series of floor beams 3 and 11. In this instance the braces 9 and 15 are welded at the bottom to the bottom flange 7. They are welded to the floor plate 1 at intermediate points between the adjacent beams.

The above description illustrates one form which the invention may take. The structure thus described provides a rigid floor plate which may be of special steel, materially lighter than that customarily used. The floor plate is supported or reinforced at points intermediate the floor beams. This prevents deformation of the span between the beams. The beams are also protected against bending of their webs. This not only reduces the damage to the car floor from impact, but also increases the strength of the floor with a minimum of added weight. The floor surface is supported at a greater number of points both over its lateral and longitudinal extent.

The fabrication of the car bottom in this manner can be readily effected by relatively unskilled labor and by manual or semi-automatic welding. The materials used are readily available in the form of sheets, plates, bars and other well-known structural forms.

While I have shown the preferred form of the invention it will be apparent that numerous changes can be made in size, proportions and the selection of material without departing from the invention as defined in the following claims.

What I claim is:

1. In a railroad dump car, a floor plate, a series of transverse floor beams, said beams having top and bottom flanges, said top flanges being fastened to the floor plate, a sole plate fastened to the bottom flange of each beam intermediate its ends and brace plates attached along the full length of their bottom edges to the sole plate and coextensively to spaced points on the floor plate intermediate the beams.

2. In a railroad dump car, a floor plate, a series of transverse floor I-beams supporting the floor plate, a sole plate fastened to the bottom flange of each beam intermediate its ends and a supporting brace plate attached along the full length of its bottom edge to the sole plate and coextensively to the floor plate intermediate the beams.

3. In a railroad dump car, a floor plate, a series of transverse floor beams including beams having channel form with one flange fastened to the floor plate, a sole plate fastened to the opposite lower flange, a brace plate attached along the full length of its bottom edge to the sole plate adjacent the channel beam and coextensively attached to the floor plate intermediate the beams and a second brace plate attached along the full length of its bottom edge to the free edge of the sole plate beyond the lower beam flange and coextensively attached to the floor plate intermediate the beams.

4. In a railroad dump car, a floor plate, a series of transverse floor beams including beams having channel form with one flange fastened to the floor plate, a brace plate attached along the full length of its bottom edge to the lower edge of each channel beam and coextensively attached to the floor plate intermediate the beams and a second brace plate attached along the full length of its bottom edge to the edge of the lower flange of each channel beam and coextensively attached to the floor plate intermediate the beams.

5. In a railroad dump car, a floor plate, a series of transverse floor beams supporting the floor plate at spaced intervals, and brace plates transversely attached along the full length of their bottom edges to the lower edges of the beams and coextensively attached to the floor plate intermediate the beams and dividing each said interval into three substantially equal spans.

6. In a railroad dump car, a floor plate, a series of transverse floor beams supporting the floor plate at spaced intervals, a sole plate with diagonal ends attached to the bottom of each floor beam intermediate its ends and brace plates coextensively attached along the full length of their bottom edges to the longitudinal edges of the sole plate and coextensively attached to the floor plate intermediate the beams.

7. In a railroad dump car, a floor plate, a series of transverse floor beams supporting the floor plate at spaced intervals, a sole plate fastened to the bottom of each floor beam intermediate its ends and brace plates attached along the full length of their bottom edges to the longitudinal edges of the sole plate and coextensively attached to the floor plate intermediate the beams at different distances between the ends of the sole plate and the ends of the beams.

References Cited in the file of this patent

UNITED STATES PATENTS

| | | |
|---|---|---|
| 2,078,117 | Auryansen | Apr. 20, 1937 |
| 2,180,502 | Bonsall | Nov. 21, 1939 |
| 2,235,865 | Burgess | Mar. 25, 1941 |
| 2,275,037 | Watter | Mar. 3, 1942 |
| 2,382,761 | Wilks | Aug. 14, 1945 |
| 2,541,274 | Nixon | Feb. 13, 1951 |
| 2,694,475 | Crafton | Nov. 16, 1954 |